(12) United States Patent
Takuwa

(10) Patent No.: US 7,597,466 B2
(45) Date of Patent: Oct. 6, 2009

(54) VEHICLE LAMP

(75) Inventor: Yohei Takuwa, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 12/107,919

(22) Filed: Apr. 23, 2008

(65) Prior Publication Data

US 2008/0259629 A1 Oct. 23, 2008

(30) Foreign Application Priority Data

Apr. 23, 2007 (JP) ............... 2007-112889

(51) Int. Cl.
*B60Q 3/04* (2006.01)
(52) U.S. Cl. .................. 362/543; 362/545
(58) Field of Classification Search .......... 362/543–545
See application file for complete search history.

(56) References Cited

U.S. PATENT DOCUMENTS

2003/0147252 A1* 8/2003 Fioravanti .......... 362/543

2005/0270791 A1* 12/2005 Lee .................... 362/517

FOREIGN PATENT DOCUMENTS

JP 6349306 12/1994
JP 2002245812 8/2002

* cited by examiner

*Primary Examiner*—Jong-Suk (James) Lee
*Assistant Examiner*—Julie A Shallenberger
(74) *Attorney, Agent, or Firm*—Cermak Kenealy Vaidya & Nakajima LLP

(57) ABSTRACT

A vehicle lamp can be designed to prevent troubles ascribable to handling during manufacturing, and to be capable of light distribution over a wide range while suppressing uneven light distribution in each individual lamp and suppressing light distribution variations between separate individual lamps, even at low cost. LED mounting substrates having a plurality of LEDs mounted thereon can be attached to an inner lens bracket made of a light-transmitting resin material so that the light sources can be accommodated in respective bracket portions of the inner lens bracket, having openings. The inner lens bracket to which the LED mounting substrates are attached can further be attached to the inner panel so that the bracket portions accommodating the LEDs protrude from the bracket portion insertion holes of the inner panel.

24 Claims, 6 Drawing Sheets

Lateral side ← → Center side

VEHICLE LAMP

This application claims the priority benefit under 35 U.S.C. § 119 of Japanese Patent Application No. 2007-112889 filed on Apr. 23, 2007, which is hereby incorporated in its entirety by reference.

BACKGROUND

1. Technical Field

The presently disclosed subject matter relates to a vehicle lamp, and more particularly to a vehicle lamp which has LED light sources.

2. Description of the Related Art

Conventionally, there have been vehicle lamps that have a large number of LEDs arranged as their light sources. Some of the vehicle lamps have been configured to have the following structure, for example. In this structure, the LEDs are mounted on a substrate with the lead frames of the LEDs electrically connected with electrode pads which are formed on the substrate. Furthermore, part of an extension (exterior component) forms reflecting surfaces around the vicinities of the light emitting areas of the LEDs so as to increase the illumination area of light by means of the reflecting surfaces.

In this case, the lead frames are utilized to situate the light emitting areas of the LEDs away from the substrate, thereby increasing the utilization efficiency of light emitted from the light emitting areas of the LEDs for increased illumination intensity. The light emitting areas of the LEDs are also located at shallower positions from the open top ends of the reflecting surfaces (the front of the extension) so that the light can be projected for a wider range of distribution.

If this configuration fails to provide a sufficient coverage of light illumination, then an outer lens having upper lens cut portions may also be arranged over the LEDs. This, however, gives rise to factors responsible for higher cost, including increased parts count, increased machining man-hours, and increased mold cost.

In view of the above, there has been proposed a lamp that is configured as shown in FIG. 1. More specifically, a base 50 formed in a step-like configuration has stages 59, each of which is provided with a protruding holder 51 for an LED to be inserted and attached to. The holders 51 each have a pair of cord insertion grooves. Then, electric cords 52 laid across holders 51 are held in the respective cord insertion grooves.

Each LED 55 has a pair of lead terminals 54 which have a slit 53 and are bent into a U shape. The lead terminals 54 are inserted into lead slots 56 of the holder 51 so that the electric cords 52 are fitted into the respective slits 53 of the lead terminals 54 with their insulation coating cut in. As a result, the slits 53 of the lead terminals 54 and the cores of the electric cords 52 make direct contact with each other, thereby establishing electric connection between the lead terminals 54 of the LED 55 and the electric cords 52.

A reflector 58 having a plurality of reflector portions 57 and an extension portion is also arranged over the LEDs 55. The reflector portions 57 are shaped to form a paraboloid of revolution, and are opposed to the respective LEDs 55. An outer lens is arranged in front of the reflector 58 (for example, see Japanese Patent Application Laid-Open No. 2002-245812).

In the conventional vehicle lamp having the foregoing configuration, the LEDs 55 attached to the respective holders 51 of the base 50 are held in position by means of the lead terminals 54 alone. There is thus the possibility of causing a handling inconvenience during manufacturing in which the reflector 58 accidentally collides with the LEDs 55 to bend the lead terminals 54 in the process of assembling the reflector 58, so that the direction of projection of the LEDs 55 may deviate from a predetermined direction.

Since each individual LED 55 can only illuminate a relatively narrow area, a large number of LEDs 55 are mounted to expand the illumination area if the intended lamp requires a wide range of light distribution. This contributes to increased cost.

For another specific example, there has been proposed a lamp, for example, as shown in Japanese Patent Application Laid-Open No. Hei 6-349306. In this lamp, substrates having surface-mount LEDs mounted thereon are attached to respective stages of a step-like housing. Furthermore, a lens provided with lens cut portions in the side facing toward the LEDs is arranged in front of the LEDs.

In this case, the lamp is composed of four components including the LEDs, the substrates, the housing, and the lens. The positional accuracy of the LEDs with respect to the lens cut portions depends on the accumulation of both the accuracy of mounting position of the LEDs with respect to the substrates and the accuracy of mounting position of the substrates with respect to the housing. In other words, the accuracies of assembly have a high impact on the accuracy of light distribution desired. This may result in uneven light distribution in each individual lamp, and light distribution variations between separate individual lamps.

SUMMARY

The presently disclosed subject matter has been achieved at least in part in view of the foregoing characteristics, features, and problems. According to a first aspect of the presently disclosed subject matter, a vehicle lamp can be provided which is designed to prevent troubles ascribable to handling during manufacturing, and is capable of light distribution over a wide range while suppressing uneven light distribution in each individual lamp and suppressing light distribution variations between separate individual lamps even at low cost.

According to another aspect of the presently disclosed subject matter, a vehicle lamp can include at least a front lens, a housing forming a lamp chamber together with the front lens, and a lamp unit supported inside the lamp chamber. In this vehicle lamp, the lamp unit can include a plurality of light sources, a plurality of substrates having the respective plurality of light sources mounted thereon, and an inner lens bracket for supporting the substrates, being made of a light-transmitting resin material, the inner lens bracket having a plurality of bracket portions for surrounding the respective light sources.

In the vehicle lamp as configured above, the inner lens bracket can be configured to include a base portion and the bracket portions shaped to protrude from the base portion.

In the vehicle lamp as configured above, the light sources can be LEDs.

In the vehicle lamp as configured above, ends of the bracket portions opposite from the base portion can each have a total reflecting surface for reflecting light emitted from the corresponding one of the light sources.

In the vehicle lamp as configured above, the total reflecting surface can be formed to project light in a lateral direction with respect to a vehicle when the vehicle lamp is mounted on the vehicle.

In the vehicle lamp as configured above, the bracket portions can each have a foremost end which is located in front of that of the corresponding light source.

In the vehicle lamp as configured above, the bracket portions can each have a generally cylindrical shape.

In the vehicle lamp as configured above, the bracket portions can each have openings both in their substrate side and the side opposite from the substrate side.

The vehicle lamp can be configured such that the light-source mounting substrates having the plurality of light sources mounted thereon can be attached to the inner lens bracket made of a light-transmitting resin material so that the light sources are accommodated in the respective bracket portions of the inner lens bracket. The inner lens bracket may be arbitrarily practiced with an inner panel so that it is shielded and dressed at areas excluding the bracket portions.

Then, the tips of the bracket portions are provided with the total reflecting surfaces for reflecting light emitted from the light sources, so that the light from the light sources is reflected by the total reflecting surfaces to illuminate a wide range.

In consequence, even if the inner lens bracket and the inner panel accidentally collide with each other during assembly, the light sources are protected from direct impact. This makes it possible to prevent troubles ascribable to handling during manufacturing, such as deformation and breakage of the light sources, for the sake of stable quality.

The distribution of the light emitted from the light sources is controlled at the tips of the bracket portions which surround the light sources, respectively. It is therefore possible to suppress distribution variations of the illumination light beams from the respective light sources, and expand the illumination area of light.

BRIEF DESCRIPTION OF THE DRAWINGS

These and other characteristics, features, and advantages of the presently disclosed subject matter will become clear from the following description with reference to the accompanying drawings, wherein.

DETAILED DESCRIPTION OF EXEMPLARY EMBODIMENT

Figure 1:
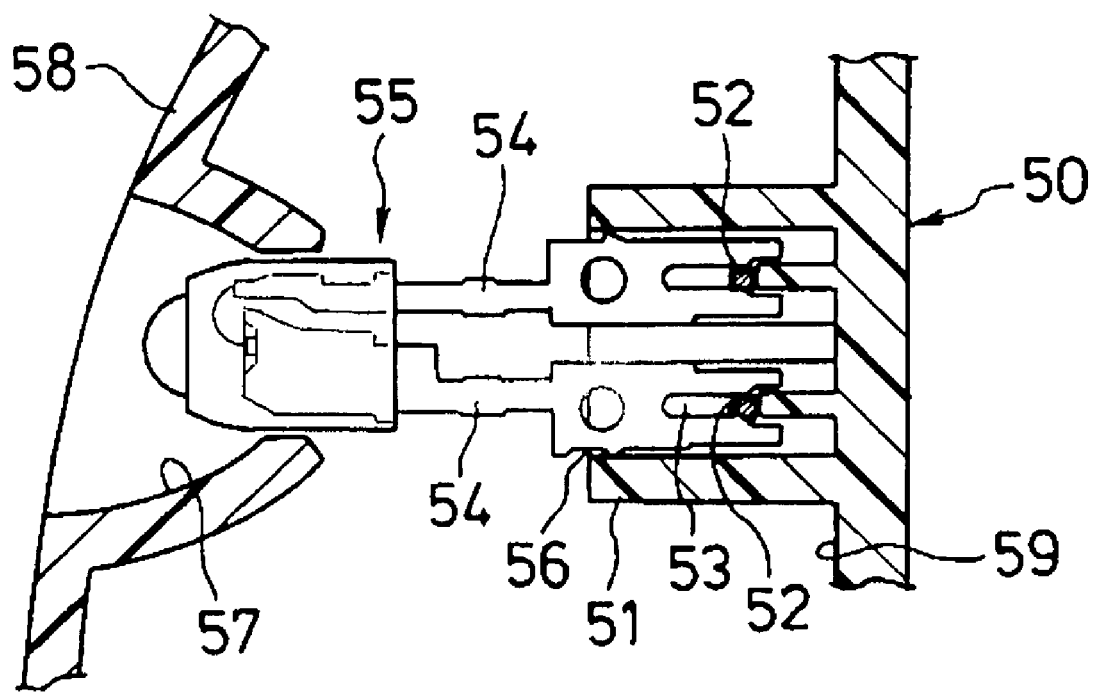
FIG. 1 is a partial sectional view of a conventional vehicle lamp.

Hereinafter, an exemplary embodiment of the presently disclosed subject matter will be described in detail with reference to FIGS. 2 to 8 (identical components will be designated by like reference numerals). It should be appreciated that the following exemplary embodiment is a specific example of the presently disclosed subject matter and thus is given various features and characteristics that work in technical terms, whereas the scope of the presently disclosed subject matter is not limited to this exemplary embodiment.

Figure 2:
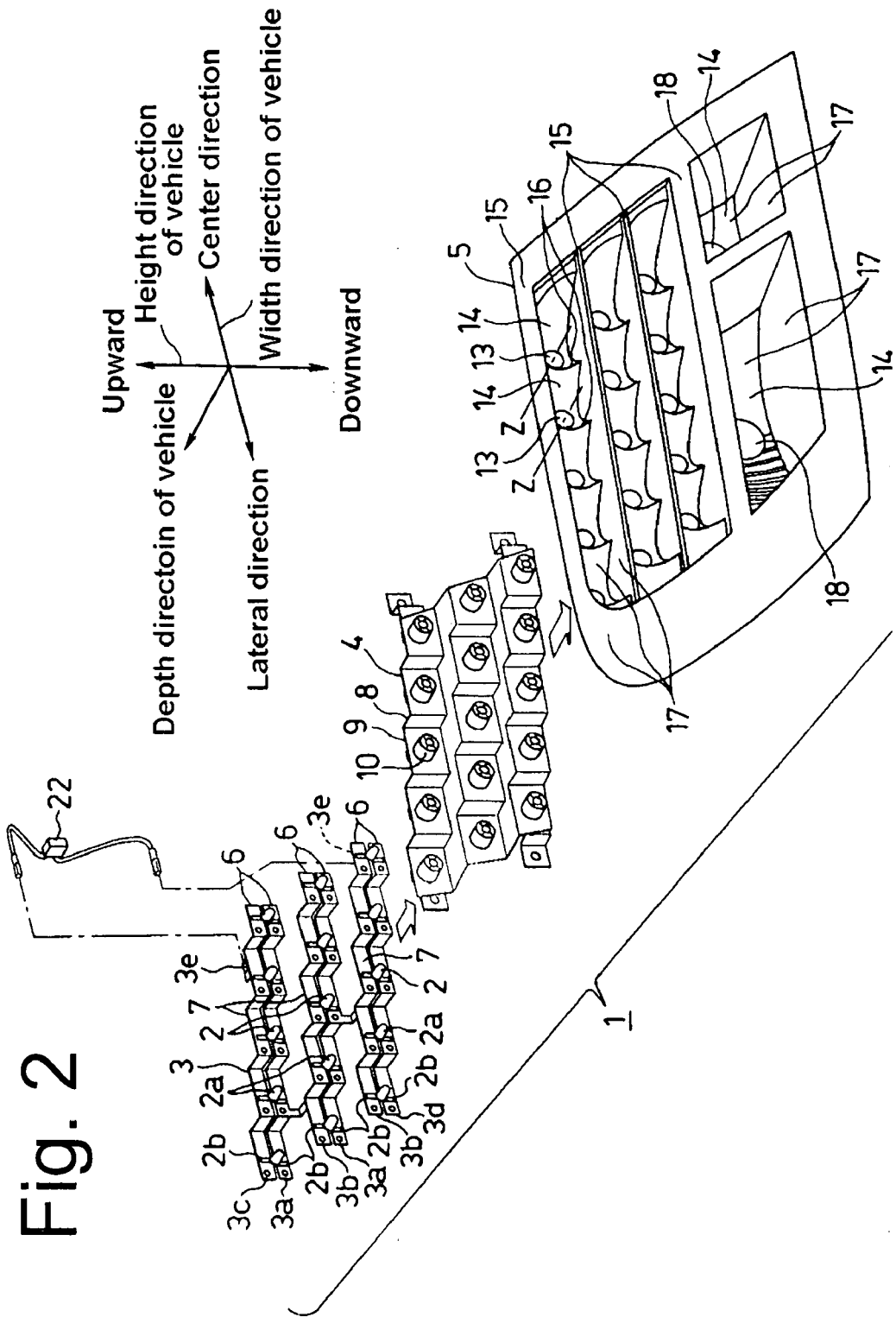
FIG. 2 is an exploded view showing an example of a lamp unit of a vehicle lamp made in accordance with principles of the presently disclosed subject matter.

FIG. 2 is an exploded view showing an exemplary embodiment of a lamp unit of a vehicle lamp made in accordance with principles of the presently disclosed subject matter. The vehicle lamp can have a lamp chamber (not-shown) which is formed by a front lens and a housing. The lamp unit 1 can be supported in this lamp chamber. The lamp unit 1 can be configured to include: LEDs 2 serving as light sources; substrates 3 for the LEDs 2 to be mounted on; an inner lens bracket 4 which supports the substrates 3 on which the LEDs 2 are mounted; and an inner panel 5 which also functions as an extension.

The substrates 3 can be metal substrates made of aluminum, copper, or other metal material. They can be configured to have a step-like configuration in the width direction of a vehicle when the assembled lamp is mounted on the vehicle. Each pair of metal substrates 3 can be arranged similarly in the height direction of a vehicle when the assembled lamp is mounted on the vehicle. Three pairs of metal substrates 3, or three substrate pairs 6, can be arranged stepwise in the height direction. In mutually adjoining substrate pairs 6, the lower substrate 3a of one of the pairs and the upper substrate 3b of the other pair can be connected to each other. The uppermost substrate 3c and the lowermost substrate 3d can have respective terminal protrusions 3e to be connected to connectors 22 for introducing electric power to these substrates.

In the following description and drawings, directional notations such as width direction, height direction, depth direction, center direction, lateral direction, upward, and downward shall indicate respective directions with respect to a vehicle when the assembled vehicle lamp is mounted on the vehicle.

Each substrate pair 6 can have LEDs 2 mounted on its respective stages 7. The LEDs 2 can be of so-called bullet type construction. In each bullet LED 2, an LED device can be mounted on the top of one of a pair of lead frames, and a bonding wire can be laid across. The LED device, the bonding wire, and their vicinity can be sealed with a sealing resin 2a made of a light-transmitting resin material, thereby forming a lens surface with respect to the LED device. In the diagram, it should be noted that the LED devices and bonding wires are omitted.

The pair of lead frames in each of the bullet LEDs 2 of the foregoing configuration can be bent at positions a predetermined distance from the end of the sealing resin 2a, into opposite directions and generally at right angles. The bent portions 2b of the pair of lead frames can be connected to any one of the substrate pairs 6 in any one of the stages 7 of the substrate pair 6. As a result, the LEDs 2 can be fixed to the substrates 3 through the lead frames, and electric power supplied from exterior can be fed to the LED devices through the substrates 3 and the lead frames.

The inner lens bracket 4 can be made of a light-transmitting resin material. Its base portion 8 can have steps, or stages 9, corresponding to the substrates 3 in the depth direction. The stages 9 can be provided with respective bracket portions 10 of generally cylindrical shape which protrude from the positions corresponding to the LEDs 2 mounted on the substrates 3.

Figure 3:
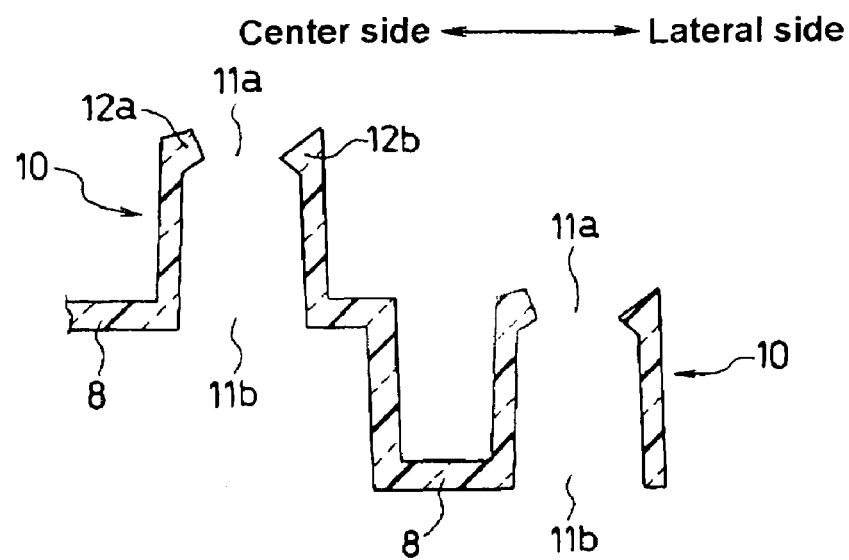
FIG. 3 is a partial sectional view of an inner lens bracket.

As shown in the sectional view of FIG. 3, each bracket portion 10 can have openings 11b and 11a in both ends, i.e., in the side of the base portion 8 and the side opposite from the base portion 8. The rim of the opening 11a opposite from the base portion 8 can be provided with an opening edge 12a and an opening edge 12b which fall on the center side and the lateral side, respectively. The opening edges 12a and 12b can have respective different shapes.

Specifically, the opening edge 12a lying on the center side can have a generally U-shaped configuration with an oblique section. The opening edge 12b lying on the lateral side can have a generally triangular configuration with its vertex toward the opening 11a in section.

Figure 4:
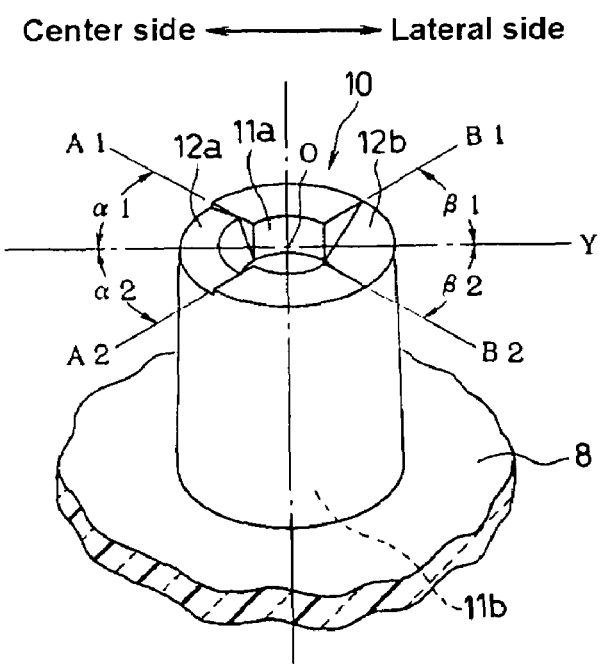
FIG. 4 is a perspective view of a bracket portion of the inner lens bracket.
Figure 5:
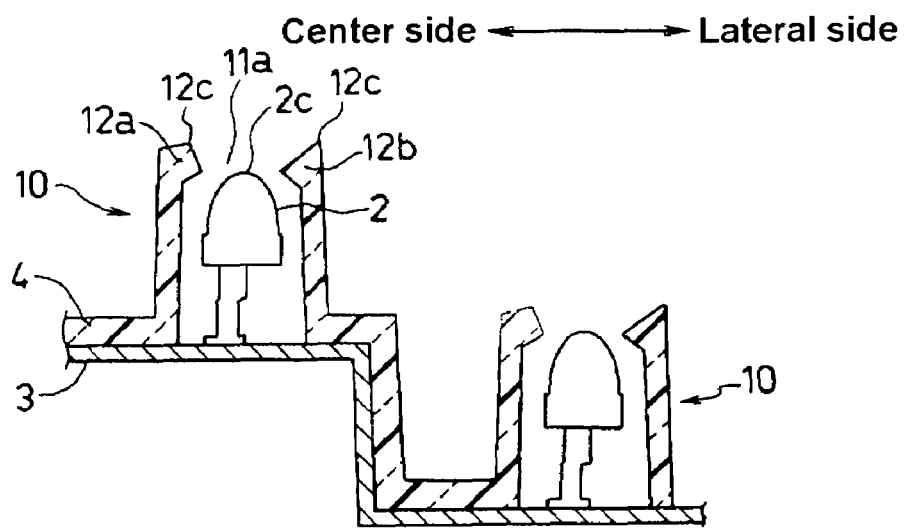
FIG. 5 is a partial sectional view showing a state where LED mounting substrates are attached to the inner lens bracket.

FIG. 4 is a perspective view of a bracket portion 10, showing the areas of the respective opening edges 12a and 12b. As shown in the diagram, the area of the opening edge 12a can stretch between two lines A1 and A2 that cross a line Y at the center O of the opening with angles of α1 and α2, respectively, where the line Y passes through the center O and links the center side and the lateral side. The area of the other opening edge 12b can stretch between two lines B1 and B2 that cross the line Y at the center O with angles of β1 and β2, respectively.

The vertex angles α1 and α2 can each be determined based on the light distribution required of the vehicle lamp. The angles β1 and β2 may be either identical to or different from each other. Similarly, the vertex angles β1 and β2 can each be determined based on the light distribution required of the vehicle lamp. The angles β1 and β2 may be either identical to or different from each other. The vertex angle (α1+α2) and the vertex angle (β1+β2) may be either identical to or different from each other.

Returning to FIG. 2, one of the sides of the inner panel 5 can have steps (not shown) in the depth direction, corresponding to the base portion 8 of the inner lens bracket 4. The stepped portions can have bracket portion insertion holes 13 for the bracket portions 10 of the inner lens bracket 4 to be inserted to, at positions corresponding to the respective bracket portions 10.

The other side of the inner panel 5 can have curved surfaces 14 which are located around the center lines Z of the respective bracket portion insertion holes 13. In cross section, each of the curved surfaces 14 traces a curve that rises from the rim of the corresponding bracket portion insert hole 13 and approaches the near side in an outward convex configuration when viewed from within the lamp chamber.

The areas above and below the bracket portion insertion holes 13 in the height direction may be partitioned by shield walls 15. Ridge lines 16, along which curved surfaces 14 mutually adjoining in the width direction intersect each other, can be formed on the center sides and the lateral sides of the respective bracket portion insertion holes 13 in the width direction. The ridge lines 16 on the center and lateral sides of the respective bracket portion insertion holes 13 can be formed so that those ridge lines 16 lying on the lateral sides lie behind those on the center sides in the depth direction.

As described above, the inner panel 5 can also function as an extension. In order to provide a silver metallic texture to viewers who see the lamp from the front, a metal film made of aluminum, silver, chromium, or the like can be formed at least on the side of the inner panel 5 where the curved surfaces 14 are formed. Namely, the resulting metal film on the inner panel 5 can make optical reflecting surfaces 17.

The inner panel 5 also has bulb insertion holes 18 for a non-LED light source such as a light bulb to be inserted through, and curved surfaces 14 which rise from the rims of the bulb insertion holes 18.

A description will now be given of an exemplary process for assembling a lamp from the components described above. Initially, as shown in the sectional view of FIG. 5, the LED mounting substrates 3 can be attached to the inner lens bracket 4 from the side opposite from where the bracket portions 10 are formed on, so that the LEDs 2 are accommodated in the respective bracket portions 10.

It follows that the tips 2c of the LEDs 2 lie inside the inner lens bracket 4, behind the foremost ends 12c of the opening edges 12a and 12b of the bracket portions 10. The LED 2 can thus be surrounded by the respective bracket portions 10.

Figure 6:
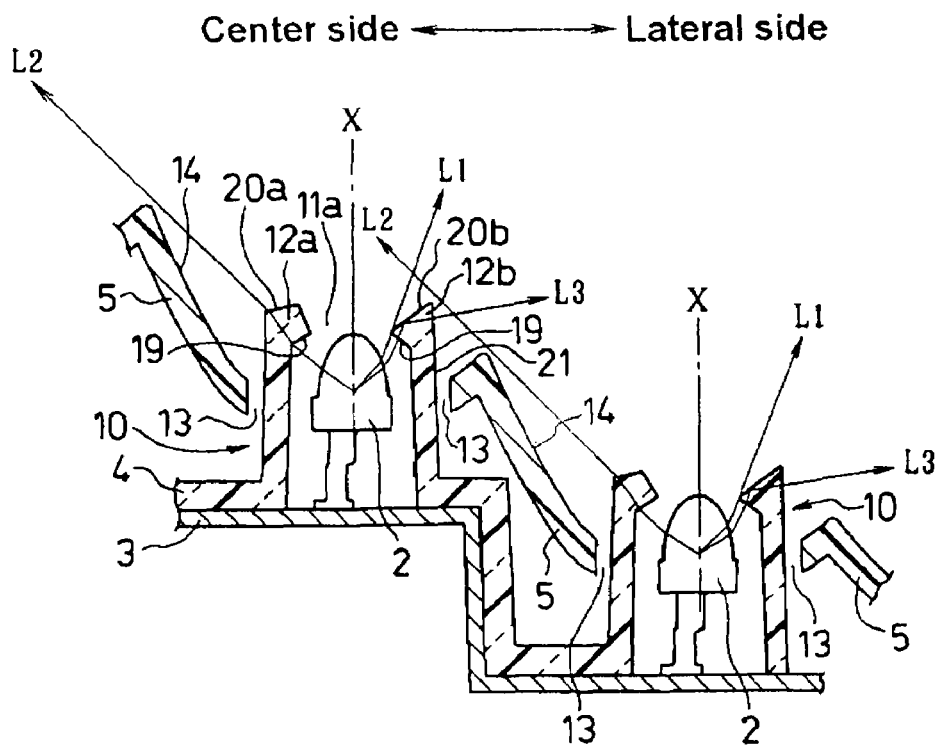
FIG. 6 is a partial sectional view of an inner panel to which the inner lens bracket having the LED mounting substrates attached thereto is attached.

Subsequently, as shown in the sectional view of FIG. 6, the inner lens bracket 4 having the LED mounting substrates 3 attached thereto can be attached to the inner panel 5 from the side opposite from where the curved surfaces 14 are formed on, so that the bracket portions 10 accommodating the LEDs 2 are inserted into the bracket portion insertion holes 13.

As a result, the bracket portions 10 of the inner lens bracket 4 and the LEDs 2 accommodated in these bracket portions 10 can protrude into the curved surfaces 14 through the bracket portion insertion holes 13 of the inner panel 5.

In this case, light beams L1 emitted from the LEDs 2 toward the openings 11a in the bracket portions 10 of the inner lens bracket 4 can pass through the openings 11a and projected ahead of the LEDs 2.

Meanwhile, the LEDs 2 can also emit light beams L2 toward the inner surfaces 19 of the generally U-shaped opening edges 12a which lie on the center sides of the bracket portions 10 of the inner lens bracket 4 with oblique sections. The light beams L2 can enter the opening edges 12a through the inner surfaces 19, can be guided through the opening edges 12a to reach the outer surfaces 20a, and can be emitted from the outer surfaces 20a to an area outside the bracket portions 10. Traveling along these optical paths, the light beams L2 can thus be projected ahead of the LEDs 2 at greater angles with respect to the optical axes X of the LEDs 2 than the light beams L1, which are emitted from the LEDs 2 and passed through the openings 11a in the bracket portions 10.

The LEDs 2 can also emit light beams L3 toward the inner surfaces 19 of the generally triangular opening edges 12b which lie on the lateral sides of the bracket portions 10 of the inner lens bracket 4 with their vertexes toward the openings 11a. The light beams L3 can enter the opening edges 12b from the inner surfaces 19, can be guided through the opening edges 12b to reach the outer surfaces 20b, and can be totally reflected from the outer surfaces 20b. The reflected light beams L3 can be guided through the opening edges 12b again to reach the outer peripheries 21 of the opening edges 12b of the bracket portions 10, and can be emitted from the outer peripheries 21 to an area outside the bracket portions 10. Traveling along these optical paths, the light beams L3 can thus be projected ahead of the LEDs 2 at greater angles with respect to the optical axes X of the LEDs 2 than are the light beams L2, which are emitted from the LEDs 2 and projected outside the bracket portions 10 through the outer surfaces 20a of the opening edges 12a.

Turning now to the inner panel 5, ridge lines 16 can be formed on the center and lateral sides of the respective bracket portion insertion holes 13. The ridge lines 16 can be formed so that the ridge lines 16 on the lateral sides lie behind the ridge lines 16 on the center sides in the depth direction. The light beams L3 can be reflected by the outer surfaces 20b, or total reflecting surfaces, of the opening edges 12b of the bracket portions 10 to travel sideways from the outer peripheries 21. In this instance, most of the light beams L3 can simply be projected out of the vehicle lamp through the front lens to be described later without being interrupted by the curved surfaces 14 of the inner panel 5.

Furthermore, the light beams L2 can be emitted from the outer surfaces 20a of the opening edges 12a of the bracket portions 10 to an area outside the bracket portions 10 and travel toward the center. Most of the light beams L2 can also simply be projected out of the vehicle lamp through the front lens to be described later without being interrupted by the curved surfaces 14 of the inner panel 5.

As above, the bracket portions 10 of the inner lens bracket 4 can have the function of controlling distribution of the illumination light, while the outer surfaces 20b, the total reflecting surfaces, of the opening edges 12b of the bracket portions 10 can largely turn the light beams L3 into the lateral direction.

Figure 7:
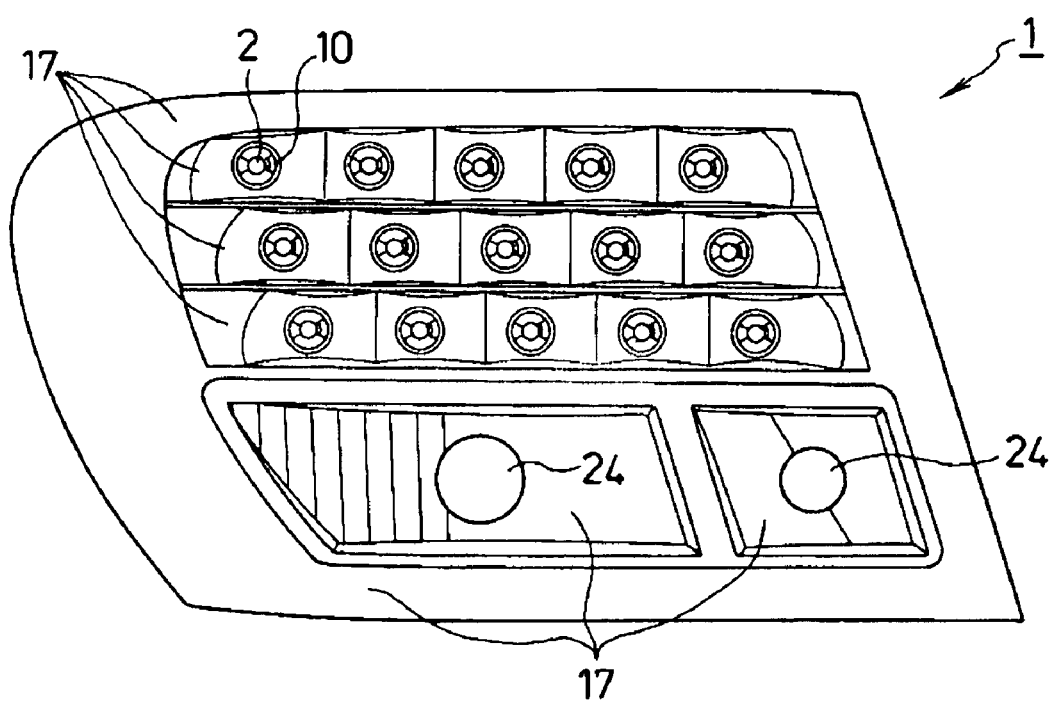
FIG. 7 is a front view of the lamp unit of the vehicle lamp of FIG. 1.
Figure 8:
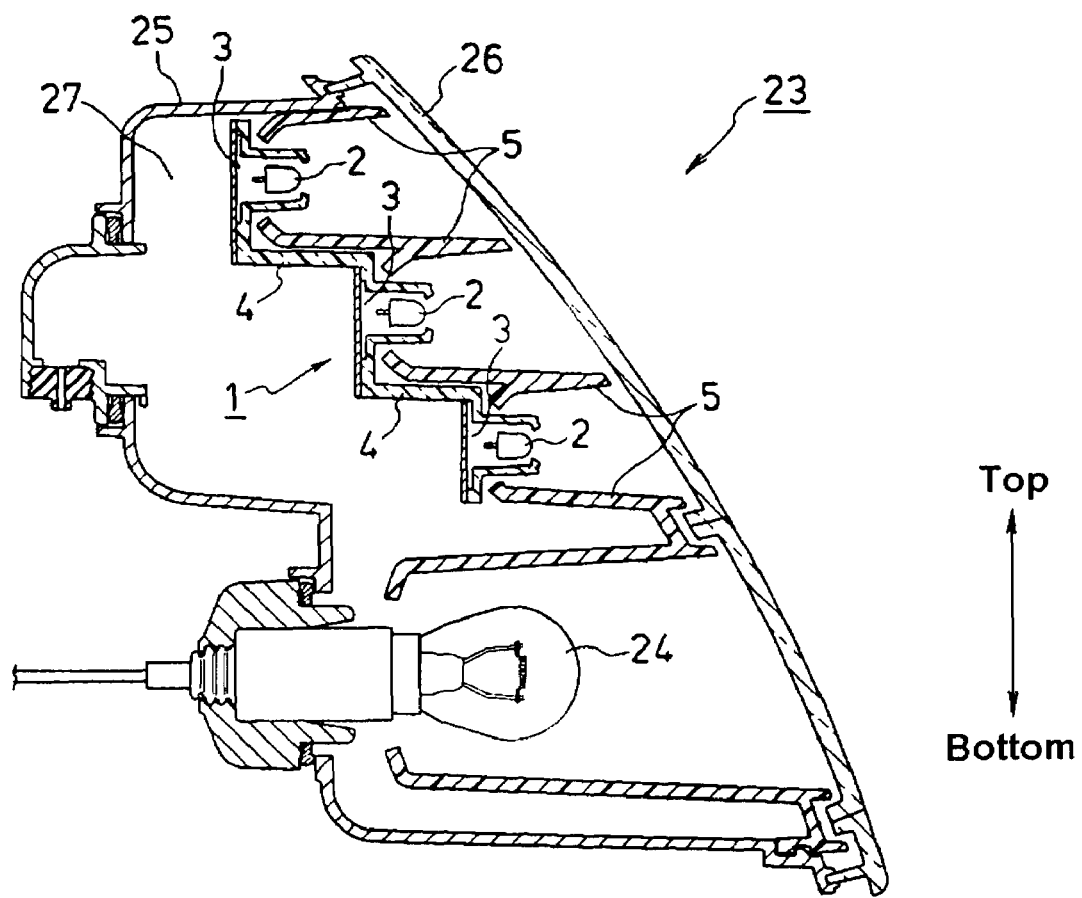
FIG. 8 is a sectional view of the vehicle lamp of FIG. 1.

FIG. 7 is a front view of the lamp unit 1 described above, in which the inner lens bracket having the LED mounting substrates attached thereto is attached to the inner panel. FIG. 8 is a longitudinal sectional view of a vehicle lamp 23 having the lamp unit 1 supported therein, as sectioned along the depth direction. When viewed from the front in FIG. 7, the entire lamp unit 1 provides a metallic luster by means of the optical reflecting surfaces 17, inside which the bracket portions 10 of the inner lens bracket, accommodating the LEDs 2 as light sources, and the light bulbs 24 are arranged.

In FIG. 8, the substrates 3 having the LEDs 2 mounted thereon are attached to the inner lens bracket 4, which is then attached on the inner panel 5 to constitute the lamp unit 1. This lamp unit 1 is supported in a lamp chamber 27 which is formed by a housing 25 and a front lens 26. Non-LED light sources (in the present exemplary embodiment, the light bulbs 24) can also be located inside the lamp chamber 27 depending on the lighting application.

As has been described, in the vehicle lamp made in accordance with the principles of the presently disclosed subject matter, the light-source mounting substrates having a plurality of light sources (LEDs) mounted thereon can be attached to the inner lens bracket made of a light-transmitting resin material so that the light sources are accommodated in the respective bracket portions of the inner lens bracket, having openings. The inner lens bracket having the light-source mounting substrates attached is further attached to the inner panel so that the bracket portions accommodating the light sources protrude from the bracket portion insertion holes of the inner panel.

Consequently, when the light sources are lit, the light beams emitted from the light sources can be controlled in distribution at the tips of the bracket portions which surround the light sources. It therefore becomes possible to suppress distribution variations of the illumination light beams from the respective light sources, and expand the illumination area of light. This contributes to reduced light distribution variations and an expanded range of light distribution of the vehicle lamp.

In particular, the total reflecting surfaces formed on part of the tips of bracket portions increase the area of illumination in the lateral direction of the vehicle significantly, thereby providing a wider range of visibility to drivers during night driving. The visibility to other vehicles and pedestrians is also improved to provide a well-developed driving environment for safe driving.

The light distribution of the vehicle lamp can mainly be controlled by the bracket portions of the inner lens bracket, and less by the inner panel which also functions as an extension. This facilitates change, variation, or options in the optical design of the inner panel and consequently reduces the design man-hours, thereby allowing a cost reduction.

Since the light emitted from the light sources can be distributed over a wider range, it becomes unnecessary to provide light sources that are situated in or directed towards the directions of greater angles. The number of light sources to be mounted can thus be reduced for a further reduction in cost.

Moreover, during the process of attaching the inner lens bracket having the light-source mounting substrates attached thereto to the inner panel, the light sources are surrounded by the bracket portions of the inner lens bracket in advance. Thus, even if the inner lens bracket and the inner panel ever accidentally collide with each other, the light sources are protected from direct impact. This makes it possible to prevent troubles ascribable to handling during manufacturing, such as deformation and breakage of the light sources, for the sake of stable quality.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents. All related art references described above are hereby incorporated in their entirety by reference.

What is claimed is:

1. A vehicle lamp comprising:
   a front lens;
   a housing configured to form a lamp chamber together with the front lens; and
   a lamp unit supported inside the lamp chamber, the lamp unit including a plurality of light sources, a plurality of substrates having the plurality of light sources mounted thereon, and an inner lens bracket located adjacent and configured to support the substrates, the inner lens bracket being made of a light-transmitting resin material, the inner lens bracket including a plurality of bracket portions configured to surround respective ones of the plurality of light sources, wherein ends of the bracket portions opposite from a base portion of the inner lens bracket each have a total reflecting surface configured to reflect light emitted from a corresponding one of the light sources.

2. The vehicle lamp according to claim 1, wherein the inner lens bracket includes a base portion and the bracket portions are shaped to protrude from the base portion.

3. The vehicle lamp according to claim 1, wherein the light sources are LEDs.

4. The vehicle lamp according to claim 2, wherein the light sources are LEDs.

5. The vehicle lamp according to claim 2, wherein ends of the bracket portions opposite from the base portion each have a total reflecting surface configured to reflect light emitted from a corresponding one of the light sources.

6. The vehicle lamp according to claim 1, wherein the total reflecting surface is configured to project light in a lateral direction with respect to a vehicle when the vehicle lamp is mounted on the vehicle.

7. The vehicle lamp according to claim 1, wherein the bracket portions each have a foremost end which is located in front, in a vehicle lamp depthwise direction, of a foremost end of a corresponding one of the light sources.

8. The vehicle lamp according to claim 2, wherein the bracket portions each have a foremost end which is located in front, in a vehicle lamp depthwise direction, of a foremost end of a corresponding one of the light sources.

9. The vehicle lamp according to claim 3, wherein the bracket portions each have a foremost end which is located in front, in a vehicle lamp depthwise direction, of a foremost end of a corresponding one of the light sources.

10. The vehicle lamp according to claim 1, wherein the bracket portions each have a foremost end which is located in front, in a vehicle lamp depthwise direction, of a foremost end of a corresponding one of the light sources.

11. The vehicle lamp according to claim 6, wherein the bracket portions each have a foremost end which is located in front, in a vehicle lamp depthwise direction, of a foremost end of the corresponding one of the light sources.

12. The vehicle lamp according to claim 1, wherein the bracket portions each have a generally cylindrical shape.

13. The vehicle lamp according to claim 2, wherein the bracket portions each have a generally cylindrical shape.

14. The vehicle lamp according to claim 3, wherein the bracket portions each have a generally cylindrical shape.

15. The vehicle lamp according to claim 1, wherein the bracket portions each have a generally cylindrical shape.

16. The vehicle lamp according to claim 6, wherein the bracket portions each have a generally cylindrical shape.

17. The vehicle lamp according to claim 7, wherein the bracket portions each have a generally cylindrical shape.

18. The vehicle lamp according to claim 1, wherein the bracket portions each have openings both in a substrate side and a side opposite from the substrate side.

19. The vehicle lamp according to claim 2, wherein the bracket portions each have openings both in a substrate side and a side opposite from the substrate side.

20. The vehicle lamp according to claim 3, wherein the bracket portions each have openings both in a substrate side and a side opposite from the substrate side.

21. The vehicle lamp according to claim 1, wherein the bracket portions each have openings both in a substrate side and a side opposite from the substrate side.

22. A vehicle lamp comprising:
a front lens;
a housing configured to form a lamp chamber with the front lens;
a plurality of substrates located in the lamp chamber;
a plurality of light sources electrically connected to the plurality of substrates, each of the plurality of light sources having an optical axis along which light is directed when electricity is applied to the light sources; and
an inner lens bracket located adjacent the substrates, the inner lens bracket made of a light-transmitting resin material and including a plurality of bracket portions configured to surround a respective one of the light sources, the bracket portions including a first end, a second end, a first side, and a second side, the first side of the bracket portion located opposite to the second side of the bracket portion when viewed along the optical axis of a respective light source, the first side of the bracket portion being shaped differently in cross section than the second side of the bracket portion when viewed in a direction orthogonal to the optical axis of the respective light source, and wherein the shape of the first side of the bracket portion is configured to cause light to transmit at a first angle with respect to the optical axis of the respective light source, and the shape of the second side of the bracket portion is configured to cause light to transmit at a second angle with respect to the optical axis of the respective light source, an absolute value of the second angle being different from an absolute value of the first angle.

23. The vehicle lamp of claim 22, wherein the shape of the first side is configured such that all surfaces that extend from an inner wall of the first side to an opposite outer wall of the first side that is substantially parallel to the inner wall of the first side allow light emitted from the respective light source to pass though the first side and not reflect within the first side, and the shape of the second side is configured such that all surfaces that extend from an inner wall of the second side to an opposite outer wall of the second side that is substantially parallel to the inner wall of the second side includes a totally reflective surface such that light is reflected from the totally reflective surface and directed within the second side.

24. The vehicle lamp of claim 22, wherein the first side of the bracket portion is shaped to extend inward towards a respective light source when viewed in cross section and in a direction orthogonal to the optical axis of the respective light source, and the second side of the bracket portion is shaped as a partial triangle with an apex of the triangle extending inward towards a respective light source when viewed in cross section and in a direction orthogonal to the optical axis of the respective light source.

* * * * *